Jan. 22, 1929.
C. W. DAKE
1,699,690
CONNECTER
Filed Feb. 8, 1926
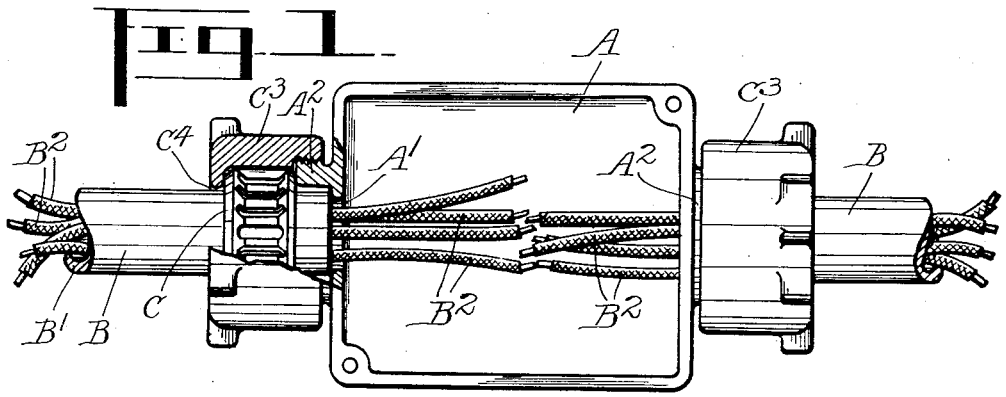
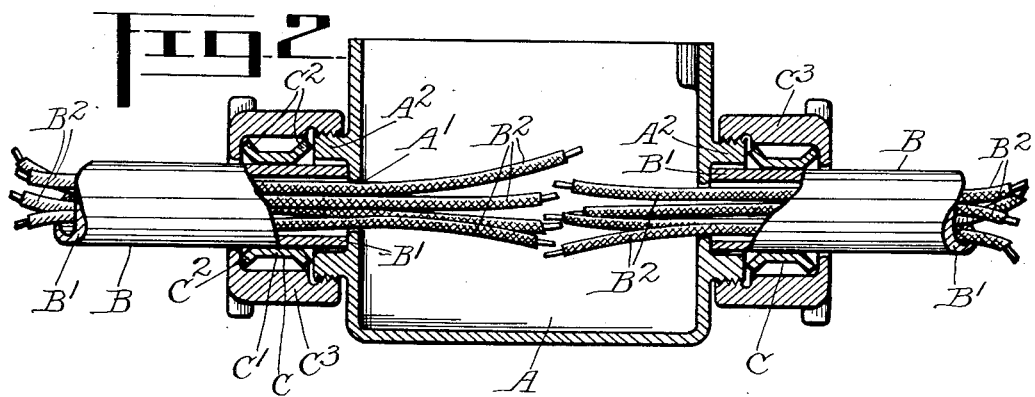
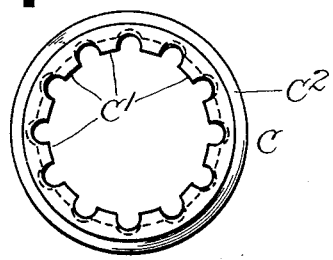
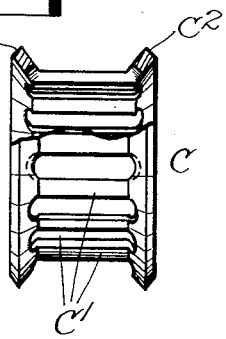
INVENTOR
Charles W. Dake
BY
ATTORNEYS.

Patented Jan. 22, 1929.

1,699,690

UNITED STATES PATENT OFFICE.

CHARLES W. DAKE, OF CHICAGO, ILLINOIS, ASSIGNOR TO THE PYLE-NATIONAL COMPANY, OF CHICAGO, ILLINOIS, A CORPORATION OF NEW JERSEY.

CONNECTER.

Application filed February 8, 1926. Serial No. 86,720.

My invention relates to improvements in cable anchors or clamps for use in connection with terminal boxes and the like. It has for one object to provide a new and improved type of clamping member or element which will grip an electric cable, hold it in place and obviate the danger of the sheath slipping loose or becoming displaced when the wires contained within the cable are stripped in the junction or terminal box. Other objects will appear from time to time throughout the specification and claims.

My invention is illustrated more or less diagrammatically in the accompanying drawings, wherein—

Figure 1 is a plan view showing parts in section;

Figure 2 is a section on the plane perpendicular to the plane of Figure 1;

Figure 3 is an end view of the clamping cage;

Figure 4 is an elevation in part section of the cage shown in Figure 3.

Like parts are indicated by like characters throughout the specification and drawings.

A is an outlet or junction box. It is apertured at $A^1$. It may have two or more apertures or even only one as the case may be. Projecting from the box concentric with the aperture is a threaded cup-like lug $A^2$.

B is the cable having a jacket or sheath $B^1$ and containing separate wires $B^2$. The outer diameter of the sheath is substantially the same as the inner diameter of the cup $A^2$. The inner diameter of the cable sheath is substantially the same as the diameter of the aperture $A^1$. C is a clamping cage. It comprises a plurality of spaced cable engaging bars $C^1$ arranged in a circle of substantially the same interior diameter as the outside diameter of the cable sheath. The two ends of the cage are bent outwardly in flanges $C^2$ $C^2$ to which the bars are attached. $C^3$ is a nut threaded on the cup $A^2$. Its inner diameter is substantially the same as the outer diameter of the flanges $C^2$ and the nut is apertured as at $C^4$ to slide upon the cable. When the nut is threaded on the cup $A^2$, it compresses the cage longitudinally engaging the edges of the flanges $C^2$. Pressure on these flanges tends to buckle or press the cage, shortening it and decreasing its interior diameter making the bars $C^1$ bite into the cable and grip it firmly. This engagement between the bars and the cable takes place as indicated adjacent the cable but slightly inside of the extreme end so that the extreme end of the cable where it terminates and where the wires leave it is firmly socketed in the cup $A^2$ and the clamping zone, has at a point slightly removed from the end of the cable thereof the danger of fraying or crushing the cable at its extreme end obviated.

It will be evident that while I have shown in my drawings an operative device still many changes might be made in the size, shape and disposition and arrangement of parts without departing materially from the spirit of my invention and I wish, therefore, that my showing be taken as in a sense diagrammatic.

I claim:

1. A clamp for cables and the like comprising a cage having a plurality of spaced longitudinally disposed bars, outwardly flared flanges at either end of the bars, means for holding the cage in position and for exerting a pressure on the outer peripheries of said flanges, in a longitudinal direction with respect to the cage.

2. A clamp for cables and the like comprising a cylindrical sleeve outwardly flanged at each end, the sleeve being longitudinally slotted between the flanges to form a series of separate longitudinal bars, means for exerting longitudinal pressure on the flanges to decrease the length of the sleeve and bend the bars inwardly to separately grip a cable, the bars gripping the cable intermediate their ends only.

3. A clamp for cables and the like comprising a cylindrical sleeve outwardly flanged at each end, the sleeve being longitudinally slotted between the flanges to form a series of separate longitudinal bars, means for exerting longitudinal pressure on the flanges to decrease the length of the sleeve and bend the bars inwardly to separately grip a cable, the bars gripping the cable intermediate their ends only, the means for exerting longitudinal pressure comprising an abutment through which a cable may pass, a second abutment surrounding the cable threaded on the first and means for rotating one with respect to the other to draw them together.

4. A clamp for cables and the like comprising a smooth walled socket adapted to enclose the end of the cable, a cup movable along the cable toward and from the socket, a compression member surrounding the cable interposed between the cup and the socket and adapted when compressed between them to grip the cable, the compression member comprising a plurality of spaced parallel bars extending longitudinally of the cable, said bars being adapted when the compression member is compressed to separately engage and grip the cable.

5. A clamp for cables and the like comprising a smooth walled socket adapted to enclose the end of the cable, a cup movable along the cable toward and from the socket, a compression member surrounding the cable interposed between the cup and the socket and adapted when compressed between them to grip the cable, the compression member comprising a cage having an outwardly flared flange and a plurality of longitudinally disposed separated bars terminating at the flange.

6. A clamp for cables and the like comprising two opposed rigid members adapted to encircle a cable, a compression member adapted to be interposed between them, and also to encircle the cable, means for drawing said members together to exert pressure on the compression member and to cause it to contract throughout its entire periphery upon the cable, the compression member comprising a plurality of spaced longitudinal bars and outwardly flared flanges joining them.

Signed at Chicago, county of Cook, and State of Illinois, this 26th day of January, 1926.

CHARLES W. DAKE.